United States Patent
Koch et al.

(10) Patent No.: US 7,038,407 B2
(45) Date of Patent: May 2, 2006

(54) CIRCUIT ARRANGEMENT AND METHOD FOR OPERATION OF AN ELECTRIC MOTOR IN A DC SUPPLY NETWORK

(75) Inventors: Stefan Koch, Kappelrodeck (DE); Peter Buerk, Lichtenau-Grauelsbaum (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/507,289

(22) PCT Filed: Jul. 25, 2003

(86) PCT No.: PCT/DE03/02514

§ 371 (c)(1),
(2), (4) Date: Sep. 10, 2004

(87) PCT Pub. No.: WO2004/057751

PCT Pub. Date: Jul. 8, 2004

(65) Prior Publication Data

US 2005/0151493 A1    Jul. 14, 2005

(30) Foreign Application Priority Data

Dec. 18, 2002   (DE)  ............................. 102 59 173

(51) Int. Cl.
*H02P 3/18* (2006.01)
(52) U.S. Cl. ............. 318/254; 318/439; 318/138; 318/603; 318/653
(58) Field of Classification Search .............. 318/254, 318/138, 439, 603, 653, 256
See application file for complete search history.

(56) References Cited

U.S. PATENT DOCUMENTS

| | | | | |
|---|---|---|---|---|
| 4,374,347 A * | 2/1983 | Muller | ..................... | 318/138 |
| 5,739,652 A * | 4/1998 | Sriram | ..................... | 318/439 |
| 5,847,523 A * | 12/1998 | Rappenecker et al. | ...... | 318/434 |
| 6,020,700 A * | 2/2000 | Tien | ........................ | 318/254 |
| 6,211,588 B1 | 4/2001 | Balsiger | | |
| 6,362,581 B1* | 3/2002 | Matsushiro et al. | ........ | 318/254 |
| 6,433,503 B1 | 8/2002 | Uematsu et al. | | |
| 6,747,425 B1* | 6/2004 | Marshall et al. | ............ | 318/254 |
| 2002/0145397 A1 | 10/2002 | Mohr et al. | | |

FOREIGN PATENT DOCUMENTS

DE   101 17 252 A1   10/2002
WO     98/52275      11/1998

* cited by examiner

*Primary Examiner*—Rina Duda
(74) *Attorney, Agent, or Firm*—Michael J. Striker

(57) ABSTRACT

The invention relates to a circuit arrangement and a method for operating an electric motor in a direct voltage source, in particular for operating a permanent-magnet-excited DC motor in the direct voltage network of a motor vehicle, having a rotary position transducer (32) for detecting the rotary position of the rotor (20), and having an electronic commutation controller (32) for switching over the current in the armature winding of the stator (12) as a function of the position of the rotor (20). It is proposed that the rotary position transducer (32) is positioned relative to the stator (12) for an early commutation, and that the actual commutation time can be set by means of a delay correction, ascertained by measurement separately for each motor (10), in the electronic commutation controller (30).

10 Claims, 1 Drawing Sheet

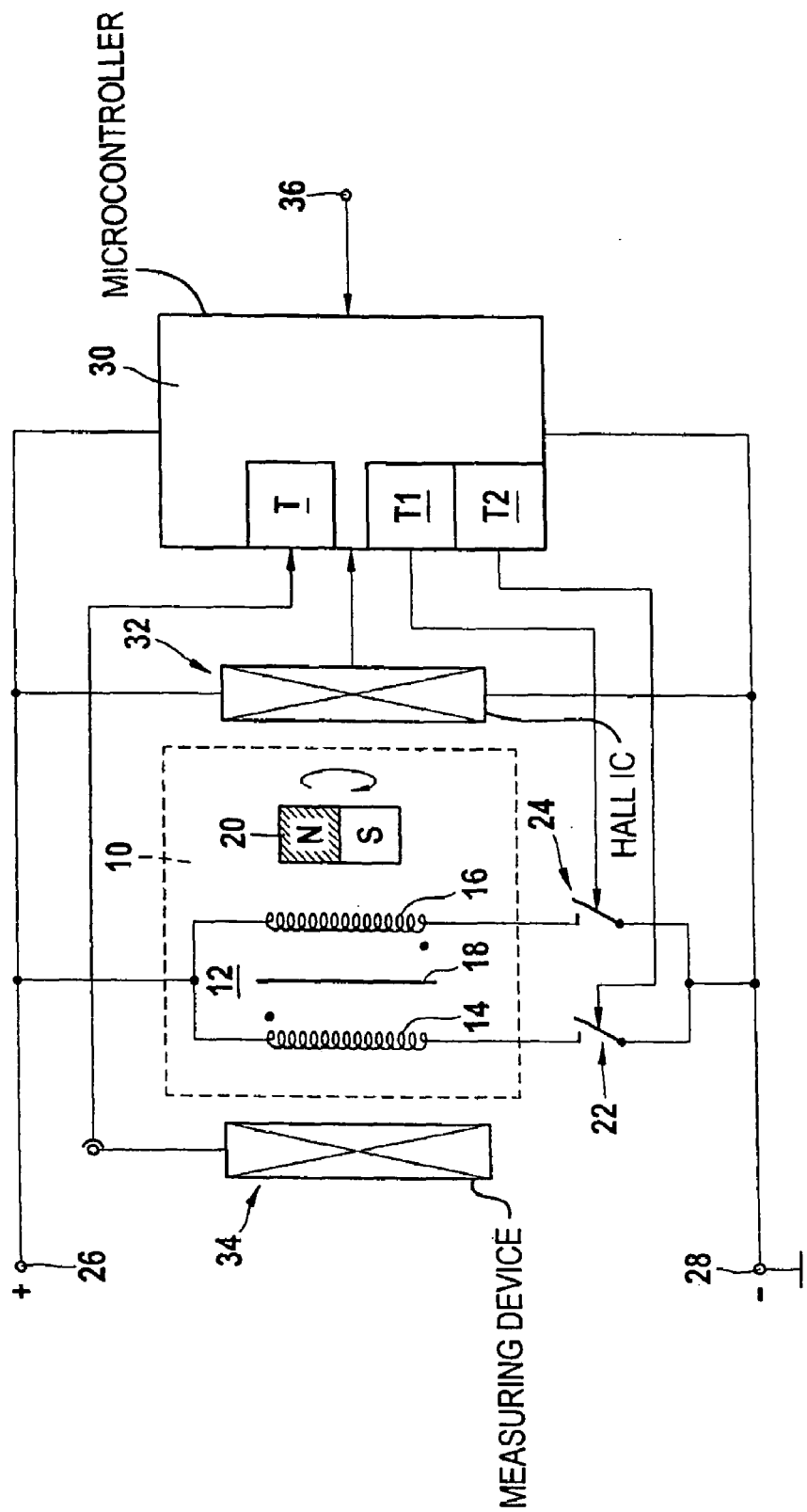

CIRCUIT ARRANGEMENT AND METHOD FOR OPERATION OF AN ELECTRIC MOTOR IN A DC SUPPLY NETWORK

BACKGROUND OF THE INVENTION

The invention is based on a circuit arrangement for operating an electric motor in a direct voltage network, in particular for operating a permanent-magnet-excited DC motor in the direct voltage network of a motor vehicle, of the kind that has been disclosed by German Patent Disclosure DE 101 17 252 A. This reference shows an electronically commutated two-phase electric motor, with a rotor excited by permanent magnets and with two windings in the stator that are supplied with current in alternation by an electronic controller via power switches, in which to regulate the electric motor, individual current supply periods per unit of time are suppressed by the electronic controller. The motor rpm is predetermined by the electronic controller from the comparison between an actual rpm and a set-point rpm, but the reference provides no information about the determination of the actual rpm. Nevertheless, the use of Hall transducers for this purpose is well known.

In addition, electric motors with electronic commutation are also known for use in motor vehicles; they have a rotor equipped with permanent magnets and a stator that carries the windings. In the motor vehicle, the areas in which such motors can be used are particularly in the field of ventilation, pumps, and adjusting drive mechanisms. The supplied current and the magnitude of the load moment determine the rpm; the rotary motion results from the supply of current to the stator windings, controlled on the basis of the rotor position, from a direct voltage network. The electronic controller is as a rule embodied by a microcontroller (μC) or a digital signal processor (DSP), and the commutation is controlled by a rotary position transducer whose exact positioning is essential if the commutation time of the motor is to be maintained in operation.

SUMMARY OF THE INVENTION

The object of the invention is to enable setting the commutation time without mechanical, or in other words without changing the position of the rotary position transducer, taking existing tolerances for the individual motor into account. This is attained by the definitive characteristics of the independent circuit and method claims, which make it possible to compensate for the total tolerances of mechanical, magnetic and electronic components after the motor has been assembled and thus to optimize the efficiency of the motor. For a pump motor, for instance, this optimization means setting the highest possible pumping power of the motor for a given driving moment.

It has proved advantageous if the electronic commutation controller is formed by a microcontroller with a delay in the output signals, which is preferably achieved by means of waiting cycles of the microcontroller after the detection of the signal change of a rotary position transducer. Expediently, the supply of current to the armature winding coils is effected via electronic power end stages, such as MOSFETs, to which the delayed output signals of the microcontroller are supplied as control signals. The delay correction is preferably effected as a function of rpm, so that depending on the rpm at the time the optimal commutation time can be maintained. Bipolar Hall ICs are especially suitable as rotary position transducers; because of their small structural size and their invulnerability to elevated temperatures, they are especially suitable for installation in electric motors, and in particular for installation in electric motors used in motor vehicles.

The circuit arrangement and the method of the invention are especially advantageously usable, because of their simple, inexpensive design, in electric motors used in large numbers, especially in the electric motors, often used in motor vehicles, that have two oppositely wound armature coils that are supplied with current in alternation via two electronic switches. The electronic commutation correction in the signal of the rotary position transducer, set to an early commutation time upon assembly, is possible in an especially simple way because the correct setting for the individual motor is ascertained once and for all by means of an external measuring device and stored in a permanent memory of a microcontroller, used as a commutation controller, or in an external memory. If the commutation controller additionally receives the rpm of the motor at the time, ascertained for instance from the spacing between signal edges of the rotary position transducer, then the triggering of the armature coils of the motor can additionally be done in a chronologically variably delayed manner.

Further details and advantageous refinements of the invention will become apparent from the dependent claims and the description of the exemplary embodiment of the invention.

BRIEF DESCRIPTION OF THE DRAWINGS

FIG. 1 shows a fundamental illustration of a timing member of the invention.

DETAILED DESCRIPTION OF THE PREFERRED EMBODIMENTS

In the drawings, 10 indicates a permanent-magnet-excited, electrically two-spooled DC motor, which is embodied magnetically with a single phase and is designed for instance as a claw pole motor. Seated in the stator 12 are two oppositely wound coils 14, 16 on a magnet armature 18. A rotor 20 of the motor 10, embodied with two poles or with a number of poles equivalent to an integral multiple of two, is designed as an inner rotor. One version of such a DC motor 10 has, per coil, an inductance of 5 to 6 mH and a resistance of 1 to 3 ohms.

The motor 10 is connected via two electronic switches 22, 24 to a direct voltage network having a positive pole 26 and a ground pole 28. MOSFETs preferably serve as the switches 22, 24. The switches are triggered via an electronic commutation controller, with a microcontroller that has two delay members T1, T2, which output the trigger signals to the switches 22, 24 in delayed fashion. A bipolar Hall IC 32, which is connected to the direct voltage source 26, 28 and furnishes the information about the position of the rotor 20, in accordance with the flow direction, either N/S or S/N, to the microcontroller 30, serves as the rotary position transducer. The microcontroller further includes a permanent, nonvolatile memory T, which serves as a long-term memory for the optimal commutation time, measured by an external measuring device 34 for the individual motor, taking all the tolerances into account. The values stored in the read-only memory T determines the correction of the rpm transducer 30, calibrated to an early commutation time upon assembly. Instead of the internal memory T of the microcontroller, however, an external memory may be used.

The circuit arrangement shown functions as follows:

As already noted above, upon assembly of the motor 10, the Hall IC 32 used as a rotary position transducer is secured to the stator 12 of the motor 10 and calibrated such that it signals an early commutation time, determined by the position of the rotor 20, in accordance with the signal edge of the Hall IC 32 that is tripped by the variable magnetic field of the rotor. The amount of the delay between the signal edge of the Hall IC 32 and the signal output of the microcontroller 30 via the timing members T1, T2 is ascertained by the measuring device 34 connected once and for all to each motor and is stored as a delay value in the read-only memory T. The latter is preferably embodied as a FLASH memory, EPROM, or EEPROM, so that in principle, even a later correction of the delay value, for instance by means of changes in tolerances that occur during operation, is possible.

The position of the rotor 20 determines which coil 14, 16 is to be supplied with current; in the magnetically single-phase motor shown, only one coil at a time is supplied with current. For instance, upon the input of a signal of the Hall IC 32, only the motor coil 14 on the left receives current. The switch 24 associated with the motor coil 16 on the right remains open until a changing edge of the signal of the Hall IC 32, in accordance with a change in the flow direction in the rotor 20, arrives at the microcontroller 30. At this instant, the coil 14 on the left is switched off via the switch 22 on the left, and the coil 16 on the right is supplied with current in delayed fashion. This delay is preferably variable in accordance with the rpm of the rotor 20, since with a variable rpm, the ideal commutation time of the motor also varies. The rotary speed of the rotor 20 is determined from the time interval between two signal edge changes of the Hall IC 32, which correspond to a change in the field direction of the rotor 20. The measuring device 34 is not part of the individual motor 10 but instead belongs to the production equipment for assembling the motors.

In operation, in addition to the input signal of the Hall IC 32, the microcontroller 30, via a further control input 36, receives a signal for the set-point rpm of the motor 10, which is compared with the actual signal of the Hall IC 32 and switches the electronic switches 22, 24 to be conducting.

Hence the nucleus of the invention is delaying the commutation time by means of waiting cycles within the microcontroller 30 after a signal change furnished by the Hall IC 32 is detected. The length of the delay is programmed once and for all, with the aid of the measuring device 34, taking into account the total tolerances, which fundamentally remain the same, of mechanical, magnetic and electronic components after the assembly of the motor, in order to attain an optimization of the efficiency of the motor, for instance the optimization of the pumping output of a pump motor. However, the use of the invention is not limited to such a motor; on the contrary, it is usable in the same way for other electronically commutated motors as well, especially other brushless DC motors, specifically and preferably whenever the detection of their commutation is effected by means of a Hall IC.

The invention claimed is:

1. A circuit arrangement for operating an electric motor in a direct voltage source, having a rotary position transducer for detecting the rotary position of the rotor, and having an electronic commutation controller for switching over the current in the armature winding of the stator as a function of the position of the rotor, wherein the rotary position transducer (32) is positioned relative to the stator (12) for an early commutation, and wherein the actual commutation time can be set by means of a delay correction, ascertained by measurement for the motor, in the electronic commutation controller (30), wherein the amount of the delay between the signal of the rotary transducer (32) and the signal output of the commutation controller (30) is ascertained by a measuring device (34) and stored in a permanent memory (T) of the commutation controller (30).

2. The circuit arrangement of claim 1, wherein the electronic commutation controller has a digital signal processor or a microcontroller (30) with a delay arrangement (T, T1, T2).

3. The circuit arrangement of claim 1, wherein the delay arrangement includes timing members (T1, T2) which control the power end stages (22, 24) of the armature winding coils (14, 16).

4. The circuit arrangement of claim 1, wherein as the rotary position transducer, a bipolar Hall IC (32) is provided.

5. The circuit arrangement of claim 1, wherein the armature winding of the motor (10) has two oppositely wound coils (14, 16), which can be connected to the direct voltage source (26, 28) in alternation via two electronic switches (22, 24) and in a manner chronologically variably delayed by the commutation controller (30).

6. The circuit arrangement of claim 1, wherein the circuit arrangement is used for operating a permanent-magnet-excited DC motor in the direct voltage network of a motor vehicle.

7. A method for operating an electric motor in a direct voltage source, having a rotary position transducer for detecting the rotary position of the rotor, and having an electronic commutation controller for switching over the current in the armature winding of the stator as a function of the position of the rotor, wherein by means of the mechanical positioning of the rotary position transducer (32), an early commutation time is set which afterwards, by means of a correction ascertained by measurement for each motor (10), is delayed in the electronic commutation controller (30) to the optimal commutation time of the motor (10), taking into account mechanical, magnetic and/or electrical tolerances, wherein the signals for the commutation time are furnished by a rotary position transducer (32) to a commutation controller (30), are stored in memory by the commutation controller, and are delayed by waiting cycles, determined by an external measuring device (#4), after the signal change in the rotary position transducer (32) is detected.

8. The method of claim 7, wherein the delay in the output signals of the electronic commutation controller (30) is effected as a function of rpm.

9. The method of claim 7, wherein two oppositely wound armature coils (14, 16) of the motor (10) are supplied with current in alternation and chronologically variably delayed via two electronic switches (22, 24).

10. The method of claim 7, wherein the method is used for operating a permanent-magnet-excited DC motor in the direct voltage network of a motor vehicle.

* * * * *